US009657791B2

(12) United States Patent
Corsetti et al.

(10) Patent No.: US 9,657,791 B2
(45) Date of Patent: May 23, 2017

(54) ULTRA-LOW-LOSS TRANSMISSION BRAKE UTILIZING A DUAL-SOLENOID ELECTRO-MECHANICAL ACTUATOR

(71) Applicant: GM Global Technology Operations LLC, Detroit, MI (US)

(72) Inventors: Anthony J. Corsetti, Rochester Hills, MI (US); Nicholas Kokotovich, Pleasant Ridge, MI (US); David Patrick Balgaard, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 14/656,137

(22) Filed: Mar. 12, 2015

(65) Prior Publication Data

US 2016/0265609 A1    Sep. 15, 2016

(51) Int. Cl.
| | | |
|---|---|---|
| *F16D 41/12* | (2006.01) |
| *F16D 63/00* | (2006.01) |
| *F16D 65/28* | (2006.01) |
| *F16D 41/30* | (2006.01) |
| *F16D 41/16* | (2006.01) |
| *F16D 121/22* | (2012.01) |

(52) U.S. Cl.
CPC ........... *F16D 63/006* (2013.01); *F16D 41/12* (2013.01); *F16D 41/30* (2013.01); *F16D 65/28* (2013.01); *F16D 41/16* (2013.01); *F16D 2121/22* (2013.01)

(58) Field of Classification Search
CPC ........ F16D 41/12; F16D 41/125; F16D 41/16; F16D 41/30; F16D 63/006; F16D 65/28; F16D 2121/22
USPC ............... 188/82.2, 82.7, 82.77; 192/43.1
See application file for complete search history.

(56) References Cited

U.S. PATENT DOCUMENTS

| | | | | | |
|---|---|---|---|---|---|
| 3,795,075 | A | * | 3/1974 | Orzechowski | ........ G07F 17/145 188/82.2 |
| 4,934,490 | A | * | 6/1990 | Chang | ..................... B60T 1/005 188/218 XL |
| 5,159,333 | A | * | 10/1992 | Wolski | .................. F42C 15/005 340/12.1 |
| 5,346,046 | A | * | 9/1994 | Peters | .................. G05B 19/108 188/82.3 |
| 5,848,629 | A | * | 12/1998 | Baka | ...................... B60P 3/343 160/302 |
| 6,655,505 | B2 | * | 12/2003 | Oppitz | ................ F16H 63/3416 188/196 BA |

(Continued)

*Primary Examiner* — Thomas Irvin

(74) *Attorney, Agent, or Firm* — Harness, Dickey & Pierce, P.L.C.

(57) ABSTRACT

An actuator is provided for preventing rotation of a rotary component and includes a first pawl pivotable about a first pivot axis and engageable with the rotary component for preventing rotation of the rotary component in a first rotary direction. A second pawl is pivotable about a second pivot axis and engageable with the rotary component for preventing rotation of the rotary component in a second rotary direction opposite the first rotary direction. The pawls are each biased toward an engaged position with the rotary component by a pawl spring. A first and a second solenoid each include an electrically activated solenoid and an armature movable from a first position for holding the pawls out of engagement with the rotary component to a second position for allowing the pawls to be engaged with the rotary component.

8 Claims, 15 Drawing Sheets

(56) References Cited

U.S. PATENT DOCUMENTS

| | | | | |
|---|---|---|---|---|
| 6,814,201 B2* | 11/2004 | Thomas | ............... | F16D 41/185 |
| | | | | 192/43.1 |
| 6,905,009 B2* | 6/2005 | Reed | ...................... | F16D 41/16 |
| | | | | 192/43.1 |
| 7,721,860 B2* | 5/2010 | Saka | ...................... | F16D 41/16 |
| | | | | 188/82.3 |
| 8,491,439 B2* | 7/2013 | Kimes | .................. | F16D 41/084 |
| | | | | 192/43.1 |
| 9,033,116 B2* | 5/2015 | Breed | .................... | B60T 1/005 |
| | | | | 188/68 |
| 9,181,993 B1* | 11/2015 | Swales | .................... | F16D 41/16 |
| 2014/0102251 A1 | 4/2014 | Corsetti et al. | | |
| 2015/0204391 A1* | 7/2015 | Kimes | .................... | F16D 27/09 |
| | | | | 192/84.8 |
| 2016/0201740 A1* | 7/2016 | Kimes | .................... | F16D 27/14 |
| | | | | 192/46 |
| 2016/0207746 A1* | 7/2016 | Heil | ........................ | B66D 5/34 |
| | | | | 188/82.77 |
| 2016/0298704 A1* | 10/2016 | Itagaki | ................... | F16D 23/12 |

\* cited by examiner

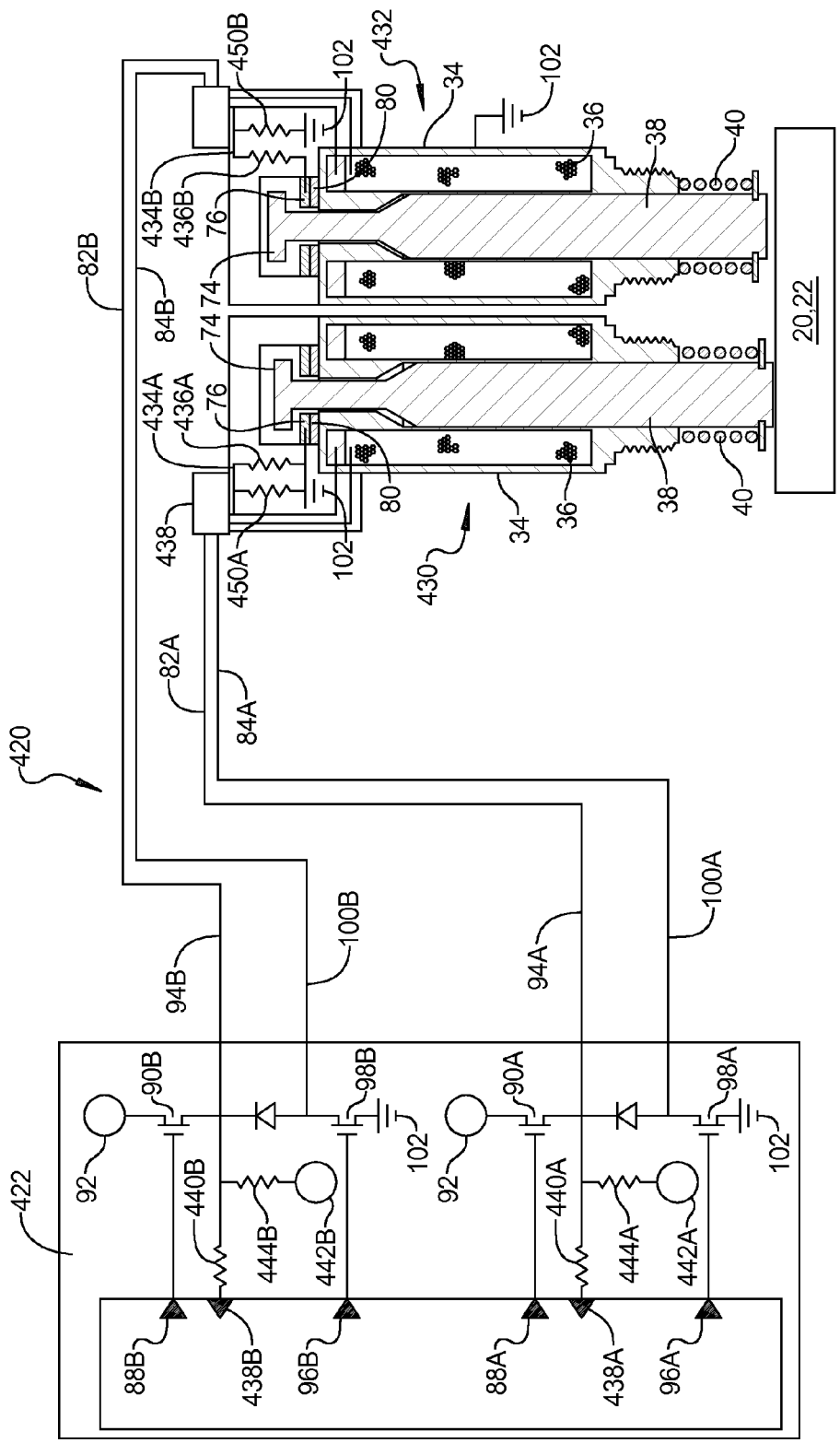

ULTRA-LOW-LOSS TRANSMISSION BRAKE UTILIZING A DUAL-SOLENOID ELECTRO-MECHANICAL ACTUATOR

FIELD

The present disclosure relates to an actuator for a transmission brake or clutch and more particularly to an ultra-low-loss transmission brake or clutch with sensing capabilities.

BACKGROUND

This section provides background information related to the present disclosure which is not necessarily prior art.

Many of today's power transmissions, especially multi-speed automatic shifting power transmissions, have one or more one-way clutches or brakes. One-way clutches have one direction of operation for performing a torque-transmitting function and in the other direction of operation permits free rotation between the two members, which are connected with the one-way clutch device. The one-way clutch can include inner and outer races, one of the races, generally the outer race is held stationary by a portion of the transmission housing. The other race of the torque-transmitting one-way clutch is connected with a gear element within the transmission.

When the gear element attempts to rotate in one direction, the one-way clutch will lock-up or be braked between the gear member and the transmission housing thereby holding the gear member stationary such that a ratio is established within the transmission. When the gear member is driven or rotated in the opposite direction, the one-way clutch permits free rotation between the inner and outer races such that the gear connected therewith is free to rotate (un-braked) relative to the meshing members.

There have been a number of proposals for one-way clutches wherein an actuator mechanism is provided to cause the one-way clutch to be energized in one direction of operation during a portion of the torque-transmitting function and upon actuation of the control mechanism or actuator, the one-way device is operable to be able to transmit torque in the opposite direction of rotation so as to provide a selectable one-way clutch.

SUMMARY

This section provides a general summary of the disclosure, and is not a comprehensive disclosure of its full scope or all of its features.

An actuator is provided for preventing rotation of a rotary component and includes a first pawl pivotable about a first pivot axis and engageable with the rotary component for preventing rotation of the rotary component in a first rotary direction. The first pawl is biased toward an engaged position with said rotary component by a first pawl spring. A second pawl is pivotable about a second pivot axis and engageable with the rotary component for preventing rotation of the rotary component in a second rotary direction opposite the first rotary direction. The second pawl is biased toward an engaged position with the rotary component by a second pawl spring. A first solenoid includes an electrically activated solenoid and an armature movable from a first position for holding the first pawl out of engagement with the rotary component to a second position for allowing the first pawl to be engaged with the rotary component. A second solenoid includes an electrically activated solenoid and an armature movable from a first position for holding the second pawl out of engagement with the rotary component to a second position for allowing the second pawl to be engaged with the rotary component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11A is a schematic view of an electronic circuit for controlling and sensing a position of a pair of solenoid actuators according to a fifth embodiment of the present disclosure;

Corresponding reference numerals indicate corresponding parts throughout the several views of the drawings.

DETAILED DESCRIPTION

Figure 1:
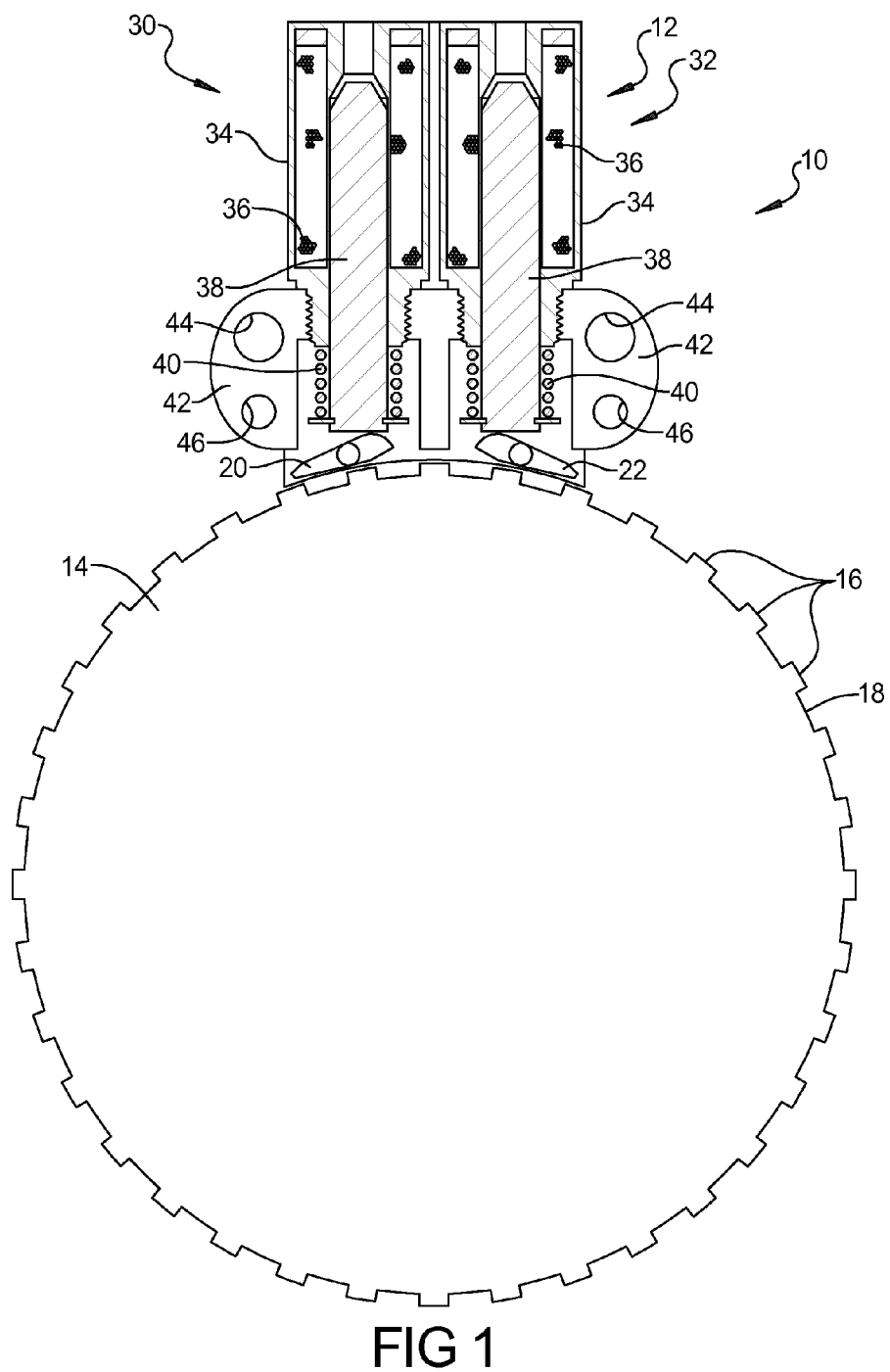
FIG. 1 is a schematic view of an ultra-low-loss transmission brake utilizing a dual-solenoid electro-mechanical actuator according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the ultra-low-loss transmission brake 10 utilizing a dual-solenoid electro-mechanical actuator 12 according to the principles of the present disclosure will now be described. The transmission brake 10 includes a rotor 14 having a plurality of teeth 16 separated by notches 18. The rotor 14 is rotatable about a center axis X and a forward rotation preventer pawl 20 and a rearward rotation preventer pawl 22 are provided for selectively engaging the teeth 16 of the rotor 14 and preventing rotation thereof. The pawls 20, 22 are spring biased into engagement with the teeth 16 of the rotor 14. The dual solenoid electro-mechanical actuator 12 includes a first solenoid 30 for acting on the forward preventer pawl 20 and a second solenoid 32 for acting on the rearward preventer pawl 22.

Each of the first and second solenoids 30, 32 include a housing 34, a solenoid coil 36 disposed within the housing 34 and an armature 38 that is reciprocatably controlled by the solenoid coil 36. A return spring 40 is provided for biasing the armature 38 to an extended position that engages the pawls 20, 22 and pushes them into a disengaged position by overcoming the force of the spring biased pawls. When the solenoid coils 36 are energized, the armatures 38 are caused to retract from engagement with the pawls 20, 22 so that the pawls 20, 22 are spring biased into engagement with the teeth 16 of the rotor 14.

The pair of solenoids 30, 32 are mounted to a frame 42 that can include bolt holes 44 for mounting the frame 42 to a transmission case. The frame 42 can include dowel holes 46 for providing precise alignment between the dual solenoid electro-mechanical actuator 12 and the rotor 14.

Figure 2:
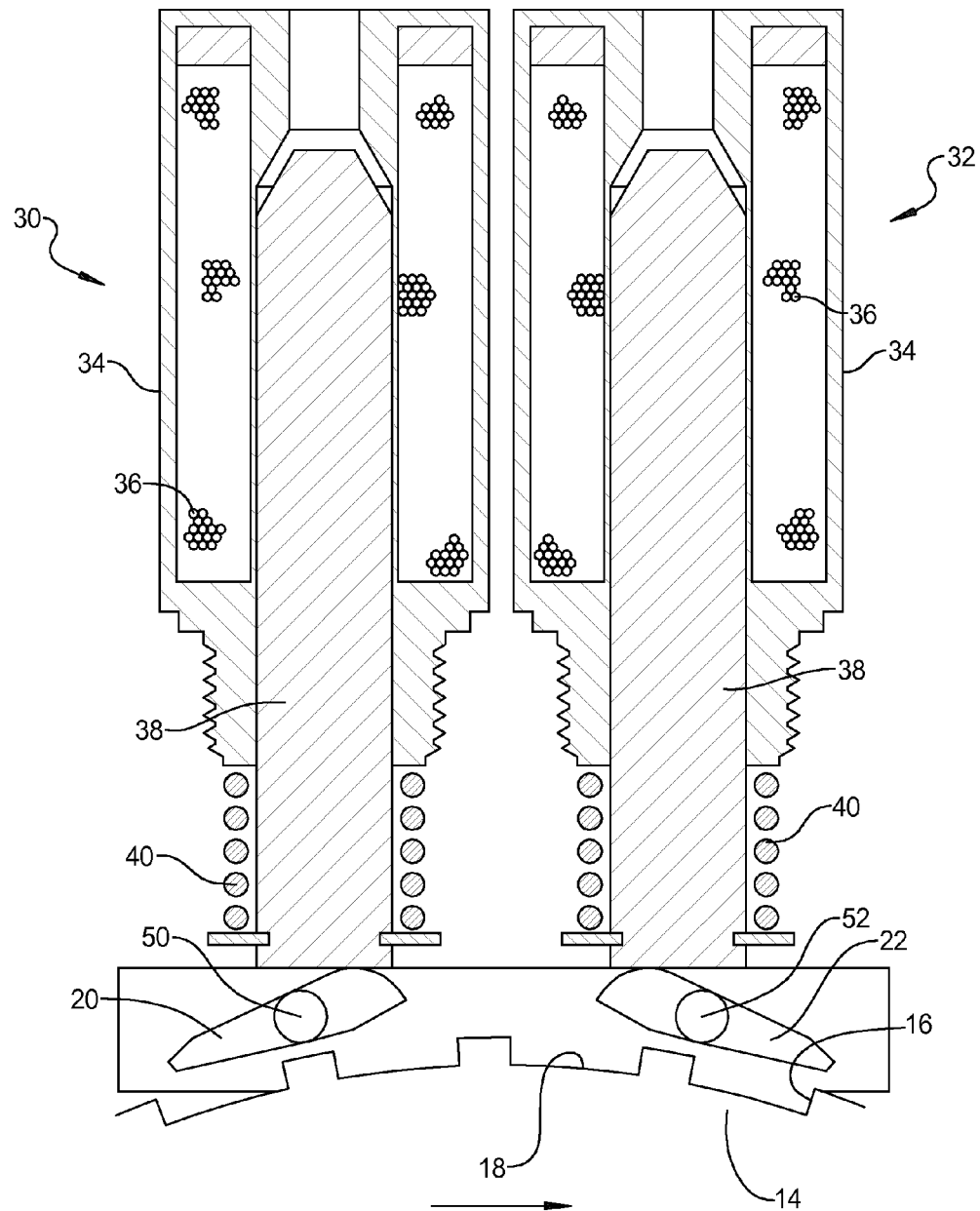
FIG. 2 is a schematic view of the dual-solenoid electro-mechanical actuator of FIG. 1 shown in a forward and reverse rotation free state.

With reference to FIG. 2, each of the solenoids 30, 32 are shown in a de-energized state with the armatures 38 fully extended and engaging the forward preventer pawl 20 and rearward preventer pawl 22 in a free state so that the pawls 20, 22 are out of engagement with the teeth 16 of the rotor 14. The strength of the return springs 40 on the armatures 38 overcome the spring force on the pawls so that the forward preventer pawl 20 and rearward preventer pawl 22 are pivoted about the pawl pivots 50, 52, respectively.

Figure 3:
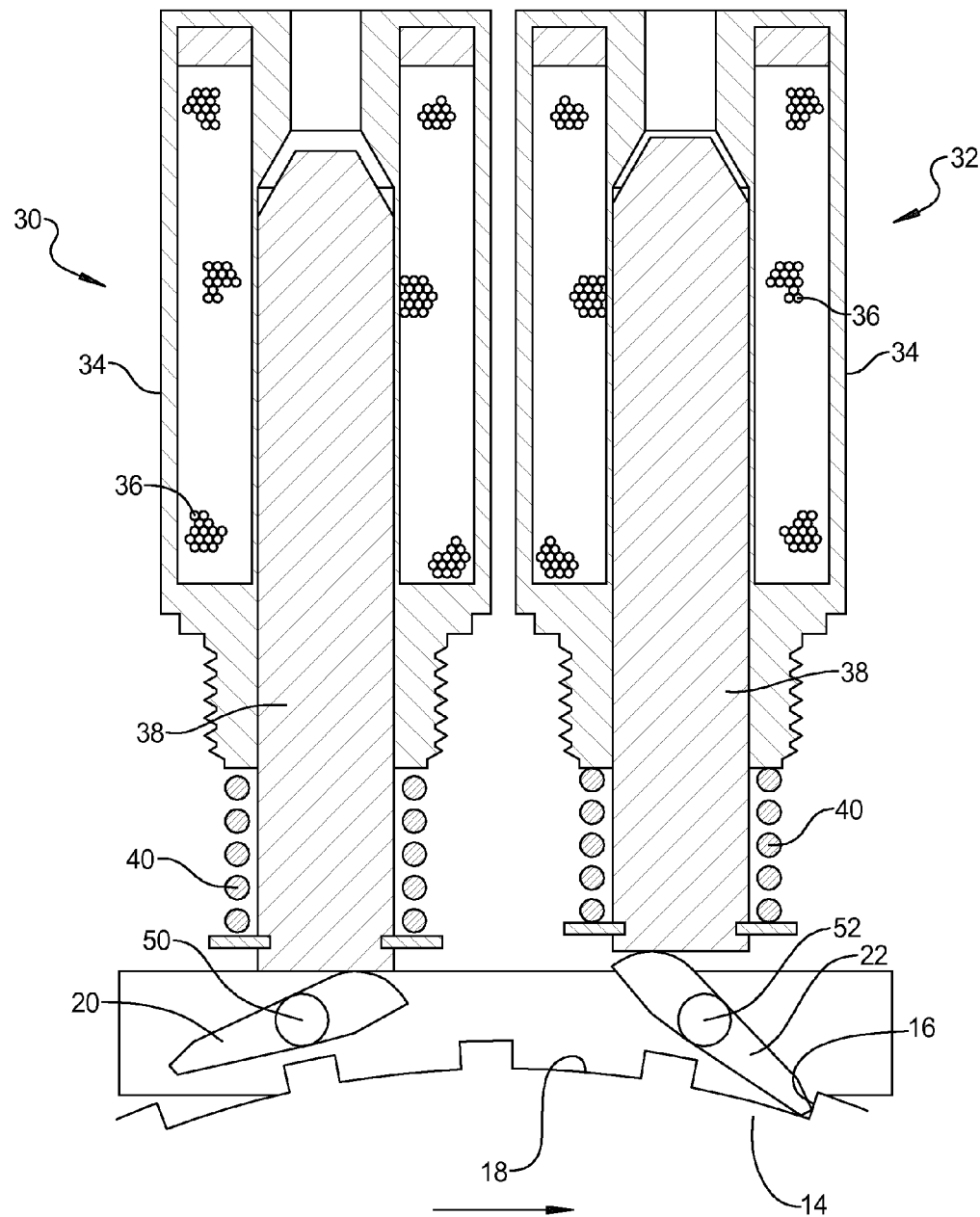
FIG. 3 is a schematic view of the dual-solenoid electro-mechanical actuator of FIG. 1 shown in a forward rotation free and a reverse rotation preventer state.

With reference to FIG. 3, the solenoid 32 is energized so that the armature 38 is retracted to allow the spring force on the pawls to bias the rearward preventer pawl 22 into engagement with the teeth 16 of the rotor 14. The solenoid 30 associated with the forward preventer pawl 20 remains de-energized so that the forward preventer pawl 20 remains disengaged from the teeth 16 of the rotor 14.

Figure 4:
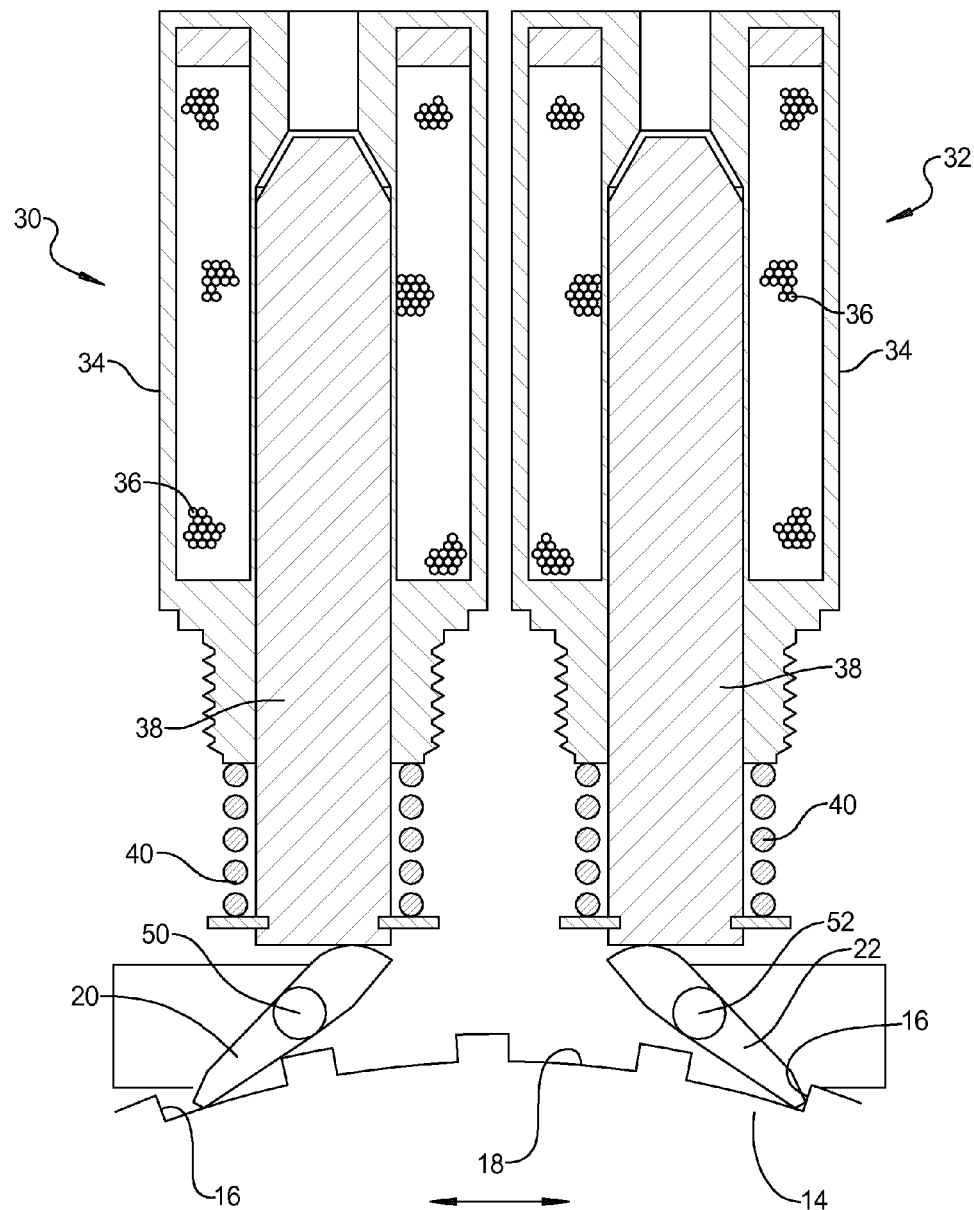
FIG. 4 is a schematic view of the dual-solenoid electro-mechanical actuator of FIG. 1 shown in a forward rotation preventer and reverse rotation preventer state.

With reference to FIG. 4, both of the solenoids 30, 32 are energized so that both of the armatures 38 are retracted to allow the spring force on the pawls to bias both the forward preventer pawl 20 and the rearward preventer pawl 22 into engagement with the teeth 16 of the rotor 14.

Figure 5:
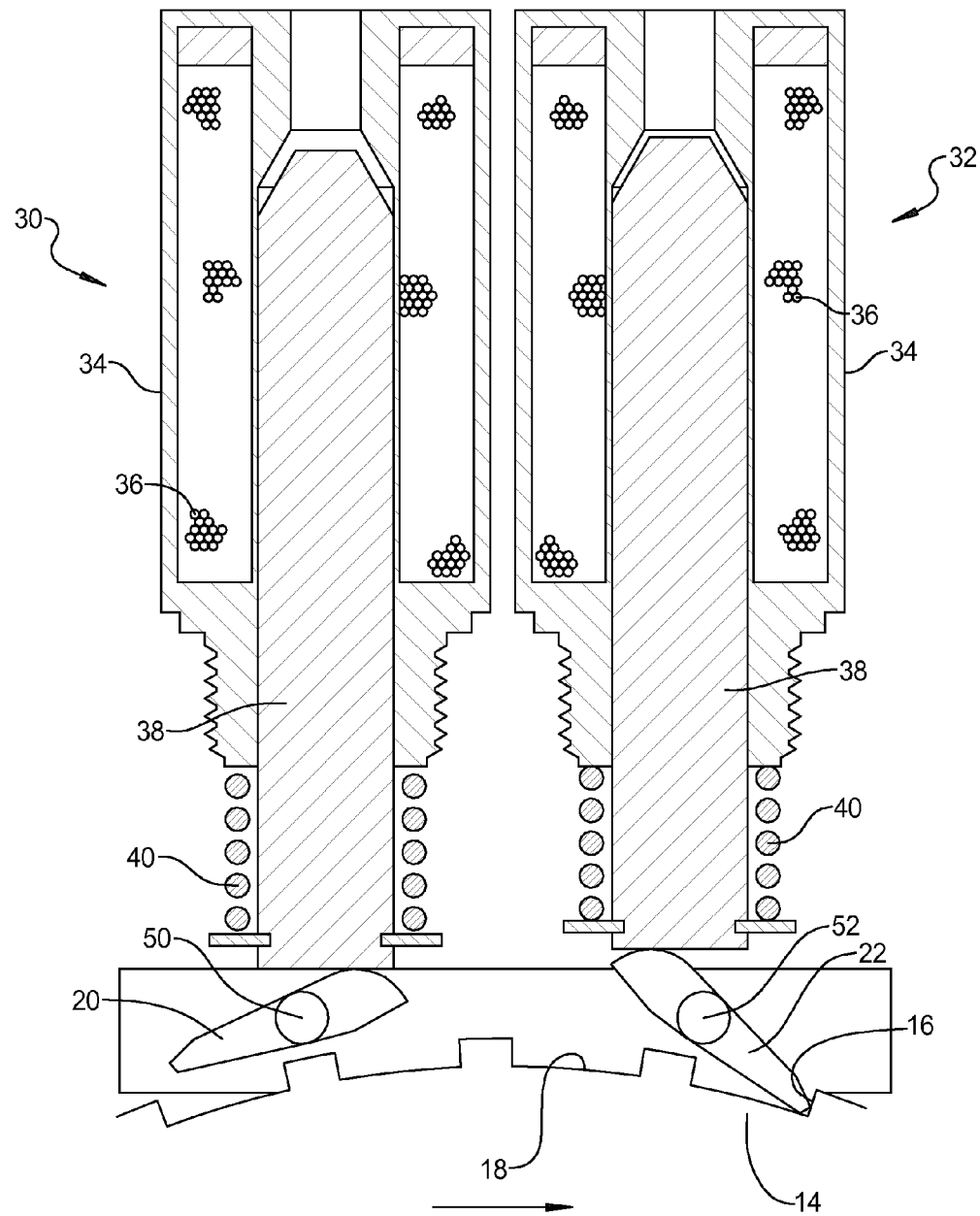
FIG. 5 is a schematic view of the dual-solenoid electro-mechanical actuator of FIG. 1 shown in a forward rotation free state with the reverse rotation pawl in an engaged state under reverse rotation load.

With reference to FIG. 5, both of the solenoids 30, 32 have returned to their de-energized state so that the armatures 38 are biased by the return springs 40 toward their fully extended position acting upon the forward preventer pawl 20 and rearward preventer pawl 22. However, as illustrated in FIG. 5, a reverse rotational load on the rotor 14 maintains the reverse preventer pawl 22 in an engaged position with one of the teeth 16 of the rotor 14. When the rotor 14 begins to rotate in a clockwise direction, the load on the reverse preventer pawl 22 is released so that the reverse preventer pawl 22 can be rotated to the disengaged position such as shown in FIG. 2.

Figure 6:
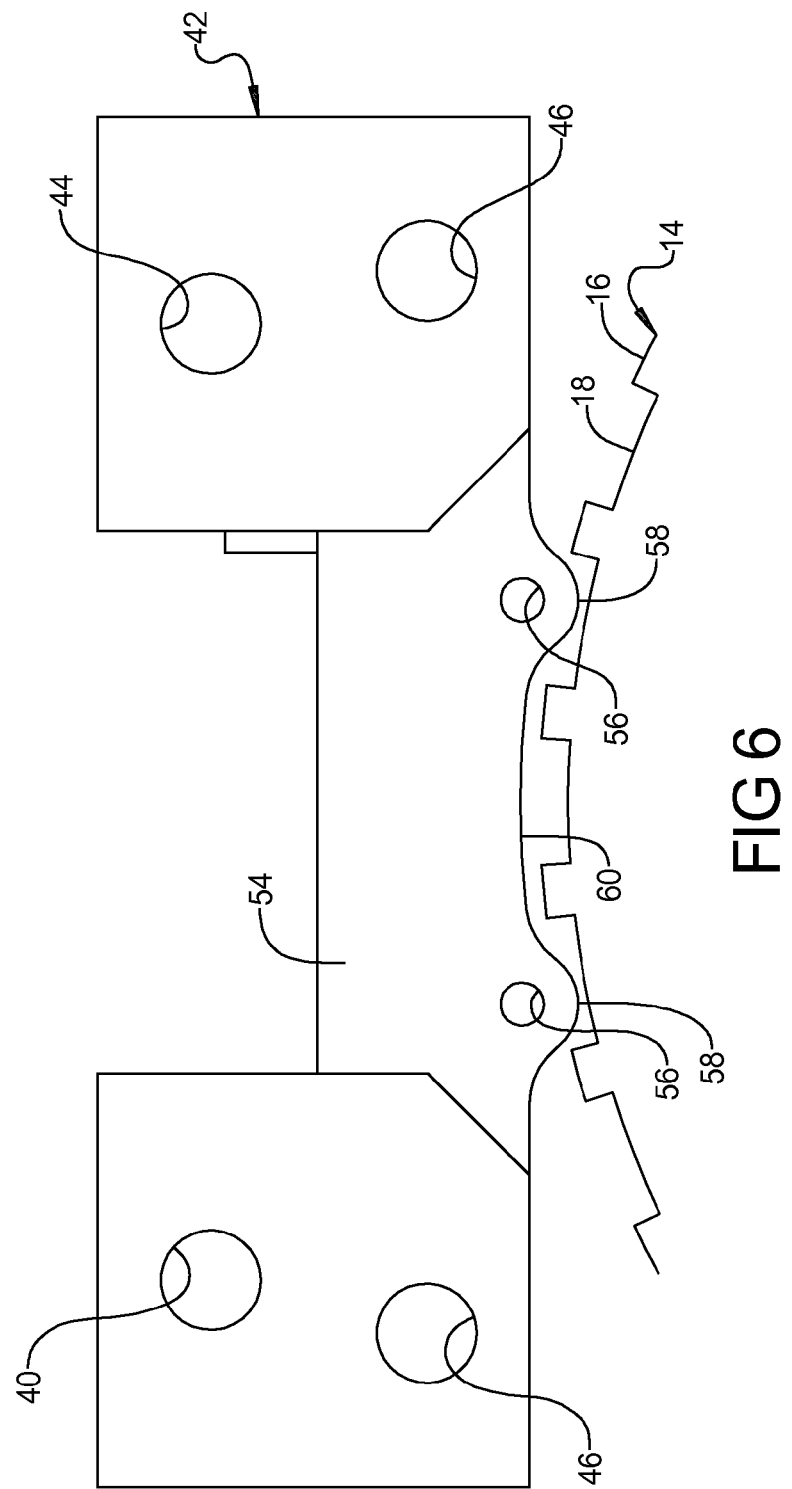
FIG. 6 is a side plan view of the pawl support plate profile allowing assembly and disassembly of the actuator assembly and/or rotor without interference between the pawl support plate and the rotor.

With reference to FIG. 6, the frame 42 of the dual-solenoid electro-mechanical actuator 12 can include a pawl mounting plate 54 having a pair of apertures 56 for receiving the pawl pivots 50, 52 of the forward preventer pawl 20 and rearward preventer pawl 22. The pawl mounting plate 54 can have a profile with extending ear portions 58 adjacent to the apertures 56. A gap space 60 can be provided between the extending ear portions 58 to provide a clearance for the teeth 16 of the rotor 14 to pass the plate 54 while the extending ear portions 58 extend into the notches 18 between teeth 16 so that the pawl mounting plate 54 and the teeth 16 of the rotor 14 do not interfere with assembly or disassembly of the dual-solenoid electro mechanical actuator 12 or the rotor 14. The pawls 20, 22 can be biased by various alternative spring devices, such as leaf springs, coil springs, torsion springs, and other known spring devices. The solenoid return spring 40 sizing considerations include response time requirements, moving mass/inertia, the pawl spring force, potential for jamming/contamination, and externally applied G-forces (e.g. from hitting bumps in the road). The apply/release/holding-on in power off states need to be analyzed in terms of these parameters. The magnetic force of the solenoids 30, 32 is then sized based on the return spring requirement. In addition, it should be understood that contamination prevention measures could be utilized to prevent contamination from affecting the operation of the solenoids 30, 32. In particular, a rubber boot or bellows can be utilized on the armature 38 and a filter medium can be utilized for preventing debris from being drawn into the back side of the solenoid housing.

With the ultralow loss transmission brake 10 according to the principles of the present disclosure, when the brake is not applied, there is zero electrical load on the system. When the brake is applied, large torque capability is achieved while a very small electrical load of less than 10 W is required to hold the armature 38 of the solenoids 30, 32 in the activated position. With the armature 38 pulled completely in (approximately 0 mm gap) a magnetic holding force of approximately 30N is achieved with lowest possible electrical power being less than approximately 2.5 W. In addition, a very fast response time for applying or releasing the brake mechanism can be achieved at less than 100 ms. The default state of the actuator assembly is that the brake is normally unapplied without electrical power being supplied. The direct-acting actuation eliminates the need for linkages for improved reliability and the actuator and wiring can be internal to the transmission case thus minimizing packaging requirements. For purposes of this disclosure, the term brake is used generically to reference any clutch or brake-type operation on any rotary component of a torque transmission mechanism.

In operation, the pawls 20, 22 are spring biased to engage the pawls 20, 22 with the rotor teeth 16 and the actuator 12 actively retracts and allows the pawls 20, 22 to engage the rotor when the solenoid is energized. Using a "pull solenoid" with a return spring allows the criteria to be met because the actuator is always guaranteed to pull-in completely (to the zero-gap, low-power-per-force continuous holding state, regardless of rotor tooth position). The high-power, high-force state is guaranteed to be very short in duration. Using two solenoids has the potential to effectively double the available force, while providing independent control of the forward and backward preventers to provide a multi-state selectable one-way brake/clutch 10.

Figure 7:
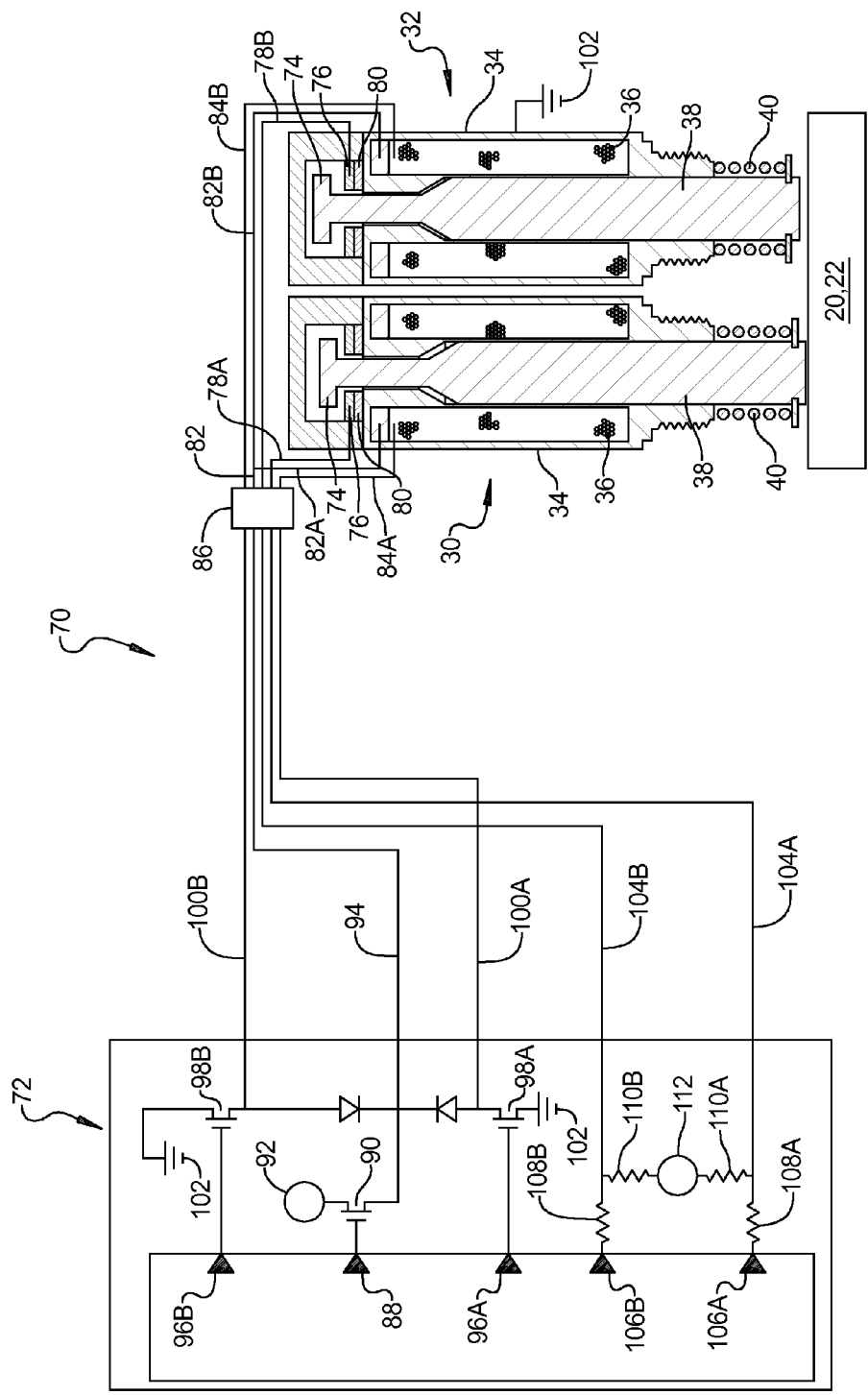
FIG. 7 is a schematic view of an electronic circuit for controlling and sensing a position of a pair of solenoid actuators according to the principles of the present disclosure.

FIG. 7 is a schematic view of an electronic circuit 70 including a control module 72 for controlling and sensing a position of the pair of solenoid actuators 30, 32 according to the principles of the present disclosure. The pair of solenoid actuators 30, 32 are provided with an armature stop 74 connected to the armatures 38. A low-current electrical contact 76 is provided in the form of a metal washer and serves as the armature's outward stop. Each of the low-current electrical contacts 76 are connected to a respective sensor wire or conductor 78A, 78B. The low-current electrical contacts 76 are insulated from the solenoid housing 40 by an electrical insulator that can be in the form of a plastic washer 80. The solenoid coils 36 of the solenoid actuators 30, 32 are both connected to a high side wire or conductor 82A, 82B and a low side wire or conductor 84A, 84B. The high side conductors 82A, 82B can be in the form of a shared conductor or wire 82 that is split into the two conductors 82A, 82B. The high sides of the coils 36 can share the shared conductor/wire 82 in order to reduce wire count on the external harness and connector. It should be understood that separate wires/conductors could be utilized without a shared wire/conductor. Each of the sensor conductors 78A, 78B, high side conductor 82 and low side conductors 84A, 84B can be connected via a five pin connector 86 to the control module 72.

The control module 72 generates a shared output signal 88 to a transistor 90 that connects a battery 92 or other power source to a shared high side conductor 94 which is in turn connected to the shared high side conductor 82 that connects the battery 92 to the solenoid coils 36. The control module 72 generates a pair of respective outputs 96A, 96B to a pair of low side transistors 98A, 98B which connect a pair of low side conductors 100A, 100B to ground 102. The low side conductors 100A, 100B are connected to the low side conductors 84A, 84B so that in operation, when the high side conductors 82A and 82B are connected to the battery 92 and either of the low side conductors 84A, 84B are connected to ground 102, then the respective solenoid coil 36 would be energized and armature 38 would be electromagnetically retracted.

In order to sense the position of the armatures 38 of the solenoids 30, 32 the low current conductor 78A, 78B of solenoids 30, 32 are connected to sensor wires or conductors 104A, 104B via the five pin connector 86. The sensor conductors 104A, 104B are connected to sensor inputs 106A, 106B via a resistor 108A, 108B. The sensor conductors 104A, 104B are also connected to a reference voltage source 112 via resistors 110A, 110B. When the armature stop 74 connected to the armatures 38 are in contact with the low current contact 76 of the solenoids 30, 32, the voltage supplied by the reference voltage source 112 is grounded so that no voltage is sensed at the sensor inputs 106A, 106B. However, when the Armature stop 74 is disengaged from the low current contact 76 of the solenoids 30, 32, the voltage supplied reference the low voltage source 112 is supplied through the resistors 108A, 108B so that a voltage signal is received indicative of the fact that the armature 38 is in its retracted/energized state. Accordingly, the control module 72 is able to monitor the sensor inputs 106A, 106B in order to determine the state of the armature position of the pair of solenoids 30, 32. In other words, when the inputs read a reference voltage level the armatures 38 are not in contact with their outward stop 76 and when the inputs read ground the armatures 38 are in contact with their outward stop 76. The control module 72 can determine whether the pawls 20, 22 are clear of the rotor 14.

Figure 8:
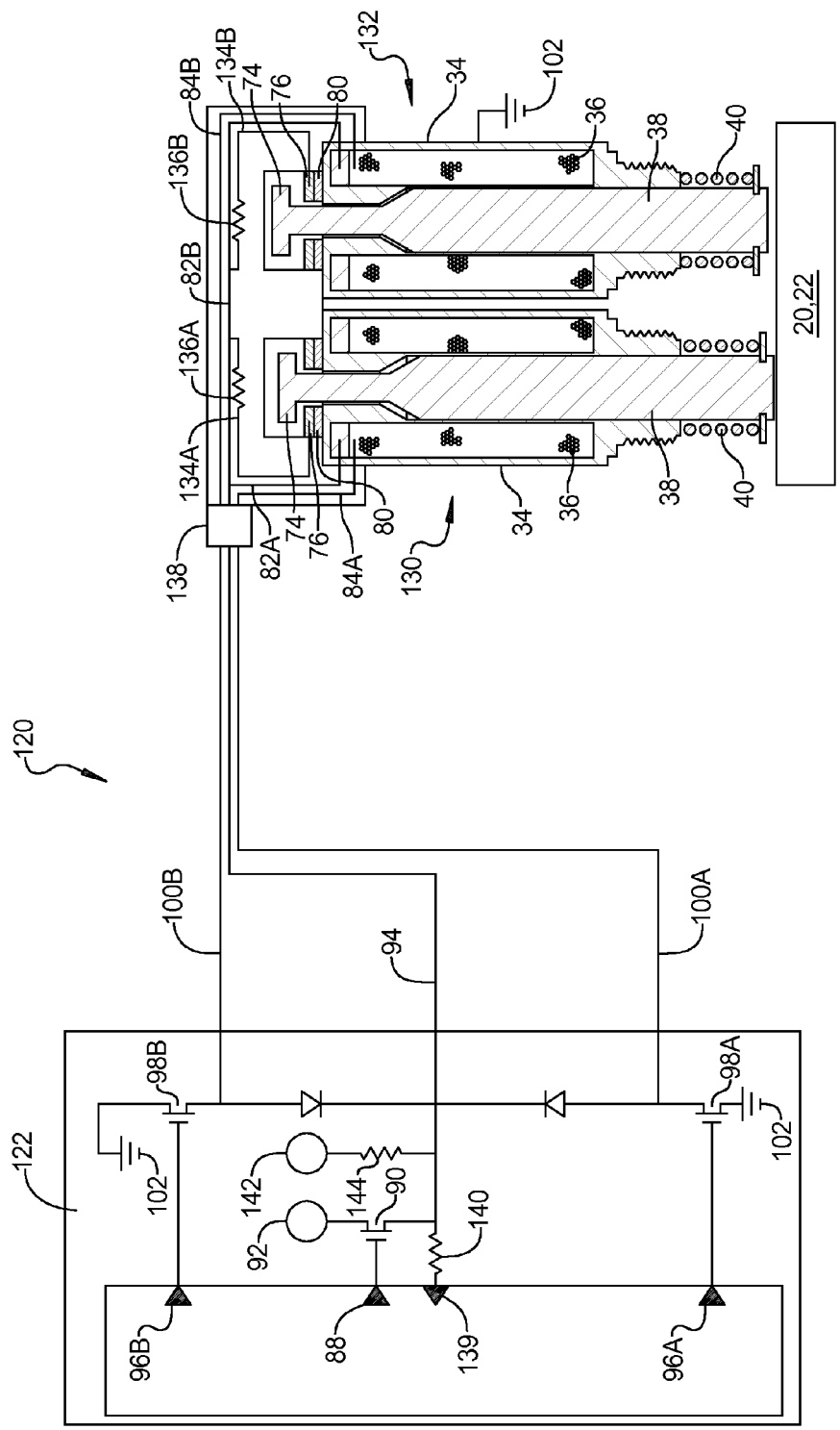
FIG. 8 is a schematic view of an electronic circuit for controlling and sensing a position of a pair of solenoid actuators according to a second embodiment of the present disclosure.

FIG. 8 is a schematic view of an alternative electronic circuit 120 including a control module 122 for controlling and sensing a position of the pair of solenoid actuators 130, 132 according to the principles of the present disclosure. The solenoid coils 36 of the solenoid actuators 130, 132 are both connected to a high side wire or conductor 82A, 82B and a low side wire or conductor 84A, 84B. The high side conductors 82A, 82B can be in the form of a shared conductor or wire 82 that is split into the two conductors 82A, 82B. The pair of solenoid actuators 130, 132 are provided with an armature stop 74 connected to the armatures 38. An electrical contact 76 is provided in the form of a metal washer and serves as the armature's outward stop. Each of the electrical contacts 76 are connected to the high side wire or conductor 82B via a respective wire or conductor 134A, 134B and resistor 136A, 136B. The low-current electrical contacts 76 are insulated from the solenoid housing 40 by an electrical insulator that can be in the form of a plastic washer 80. The high sides of the coils 36 can share the shared conductor/wire 82 in order to reduce wire count on the external harness and connector. It should be understood that separate wires/conductors could be utilized without a shared wire/conductor. Each of the high side conductor 82 and low side conductors 84A, 84B can be connected via a three pin connector 138 to the control module 122.

The control module 122 generates a shared output signal 88 to a transistor 90 that connects a battery 92 or other power source to a shared high side conductor 94 which is in turn connected to the shared high side conductor 82 that connects the battery 92 to the solenoid coils 36. The control module 122 generates a pair of respective outputs 96A, 96B to a pair of low side transistors 98A, 98B which connect a pair of low side conductors 100A, 100B to ground 102. The low side conductors 100A, 100B are connected to the low side conductors 84A, 84B so that in operation, when the high side conductors 82A and 82B are connected to the battery 92 and either of the low side conductors 84A, 84B are connected to ground 102, then the respective solenoid coil 36 would be energized and armature 38 would be electromagnetically retracted.

In order to sense the position of the armatures 38 of the solenoids 130, 132 the shared high side conductor 94 is connected to a control module input 138 via a resistor 140. The high side conductor 94 is also connected to a reference voltage source 142 via resistor 144. By way of non-limiting example, the resistor 144 can have a resistance of 3 kΩ, the resistor 136A can have a resistance of 5 kΩ, the resistor 136B can have a resistance of 3 kΩ and the resistor 140 can have a resistance of 50 kΩ. When the armature stop 74 connected to the armatures 38 are in contact with the electrical contact 76 of the solenoids 130, 132 and the shared output signal 88 is off, the voltage supplied by the reference voltage source 142 is grounded through one or both of the resistors 136A, 136B. However, when the armature stop 76 is disengaged from the electrical contact 76 of the solenoids 130, 132, the voltage supplied by the reference voltage source 142 is supplied through the resistors 144 and 140 so that a voltage signal is received indicative of the fact that both armatures 38 are in their retracted/energized state. Table 1 tabulates the different input readings 139 based upon the various operative states of the two solenoids 130, 132 wherein the armatures 38 are fully out in an un-energized state and not fully out in an energized state.

TABLE 1

| | A-to-D Reading | | Sensed Armature Position | | |
|---|---|---|---|---|---|
| HSD Command | Equation | Percent of $V_{Ref}$ Using Examples Resistor Values | Solenoid #1 | Solenoid #2 | Diagnostic Fault Status |
| ON | $V_{A2D} > V_{Ref}$ | 100% (saturated) | Unknown | Unknown | No Fault Detected |
| | $V_{A2D} < V_{Ref}$ | <100% | Unknown | Unknown | Shared High Side Wire Short to Ground; OR $V_{batt}$ is lower than $V_{Ref}$ |
| OFF | $V_{A2D} = \sim V_{Ref}$ | 100% | Not Fully Out | Not Fully Out | No Fault Detected |
| | $V_{A2D} = V_{Ref} * [1 - R_H/(R_H + R_1)]$ | 63% | Fully Out | Not Fully Out | No Fault Detected |
| | $V_{A2D} = V_{Ref} * [1 - R_H/(R_H + R_2)]$ | 50% | Not Fully Out | Fully Out | No Fault Detected |
| | $V_{A2D} = V_{Ref} * [1 - R_H/(R_H + R_1 \| \| R_2)]$ | 38% | Fully Out | Fully Out | No Fault Detected |
| | $V_{A2D} = \sim GND$ | ~0% | Unknown | Unknown | Shared High Side Wire Short to Ground |

Accordingly, the control module 122 is able to monitor the input signal 139 in order to determine the state of the armature position of the pair of solenoids 130, 132. In other words, because of the preselected resistance levels of the resistors 140, 144, 136A and 136B, the magnitude of the input signal 139 is representative of the multiple different operation states when the armature stops 74 are either in or not in contact with their outward stop 76.

Figure 9:
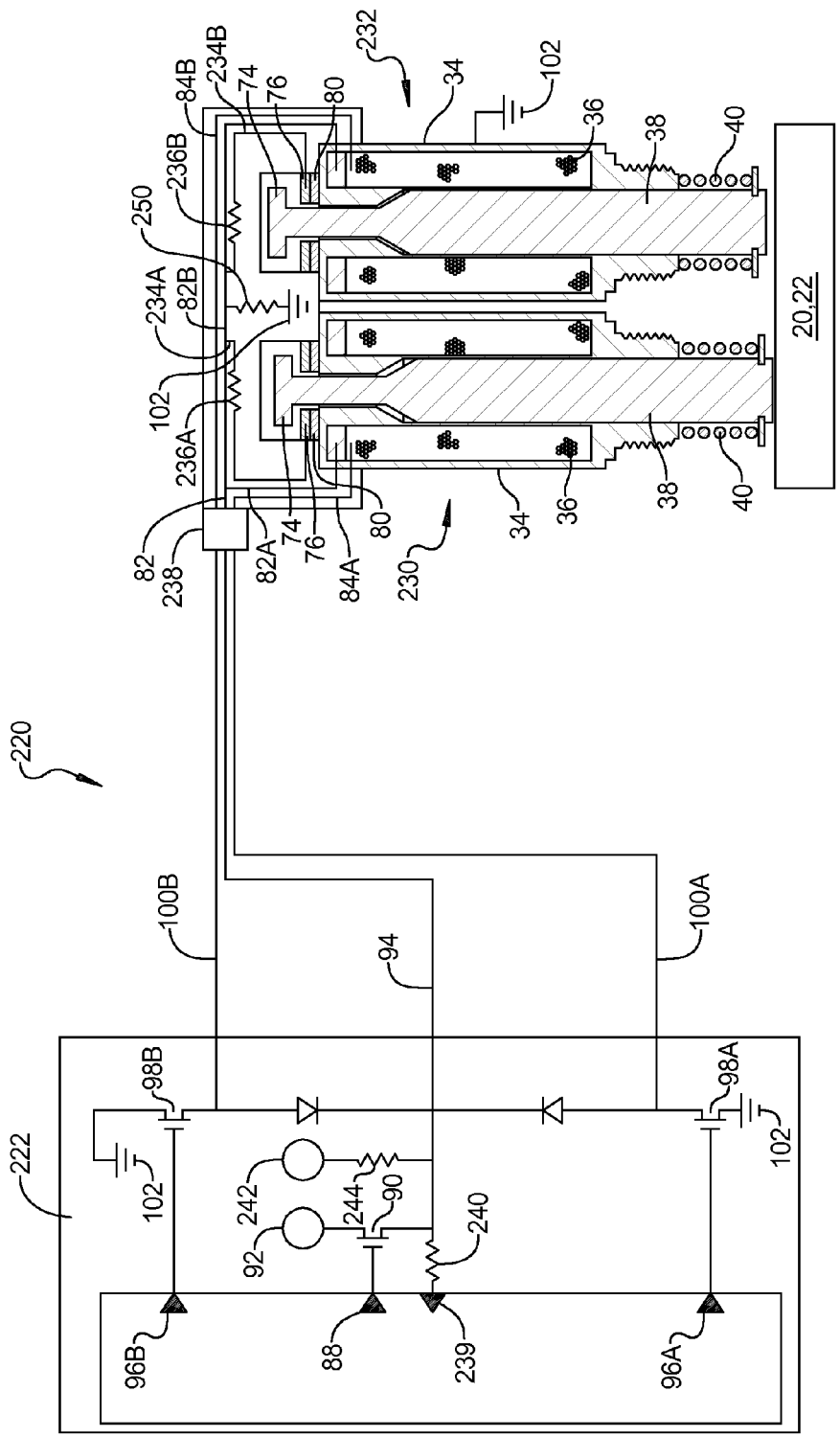
FIG. 9 is a schematic view of an electronic circuit for controlling and sensing a position of a pair of solenoid actuators according to a third embodiment of the present disclosure.

FIG. 9 is a schematic view of an alternative electronic circuit 220 including a control module 222 for controlling and sensing a position of the pair of solenoid actuators 230, 232 according to the principles of the present disclosure. The solenoid coils 36 of the solenoid actuators 230, 232 are both connected to a high side wire or conductor 82A, 82B and a low side wire or conductor 84A, 84B. The high side conductors 82A, 82B can be in the form of a shared conductor or wire 82 that is split into the two conductors 82A, 82B. The pair of solenoid actuators 230, 232 are provided with an armature stop 74 connected to the armatures 38. An electrical contact 76 is provided in the form of a metal washer and serves as the armature's outward stop. Each of the electrical contacts 76 are connected to the high side wire or conductor 82B via a respective wire or conductor 234A, 234B and resistor 236A, 236B. An additional resistor 250 connects the high side conductor 82B to ground 102. The low-current electrical contacts 76 are insulated from the solenoid housing 40 by an electrical insulator that can be in the form of a plastic washer 80. The high sides of the coils 36 can share the shared conductor/wire 82 in order to reduce wire count on the external harness and connector. It should be understood that separate wires/conductors could be utilized without a shared wire/conductor. Each of the high side conductor 82 and low side conductors 84A, 84B can be connected via a three pin connector 238 to the control module 122.

The control module 222 generates a shared output signal 88 to a transistor 90 that connects a battery 92 or other power source to a shared high side conductor 94 which is in turn connected to the shared high side conductor 82 that connects the battery 92 to the solenoid coils 36. The control module 222 generates a pair of respective outputs 96A, 96B to a pair of low side transistors 98A, 98B which connect a pair of low side conductors 100A, 100B to ground 102. The low side conductors 100A, 100B are connected to the low side conductors 84A, 84B so that in operation, when the high side conductors 82A and 82B are connected to the battery 92 and either of the low side conductors 84A, 84B are connected to ground 102, then the respective solenoid coil 36 would be energized and armature 38 would be electromagnetically retracted.

In order to sense the position of the armatures 38 of the solenoids 30, 32 the shared high side conductor 94 is connected to a control module input 239 via a resistor 240. The high side conductor 94 is also connected to a reference voltage source 242 via resistor 244. By way of non-limiting example, the resistor 244 can have a resistance of 10 kΩ, the resistor 236A can have a resistance of 15 kΩ, the resistor 236B can have a resistance of 7.5 kΩ and the resistor 250 can have a resistance of 75 kΩ. When the armature stops 74, connected to the armatures 38, are in contact with the electrical contact 76 of the solenoids 230, 232 and the shared output signal 88 is off, the voltage supplied by the reference voltage source 242 is grounded through two or more of the resistors 236A, 236B, and 250. However, when the armature stop 74 is disengaged from the electrical contact 76 of the solenoids 230, 232, the voltage supplied by the reference voltage source 242 is supplied through the resistors 244 and 240 is divided with resistor 250 so that a voltage signal 239 is received indicative of the fact that both armatures 38 are in their retracted/energized state. Table 2 tabulates the different input readings 239 based upon the various operative states of the two solenoids 230, 232 wherein the armatures 38 are "fully out" in an un-energized state and "not fully out" in an energized state.

Accordingly, the control module 222 is able to monitor the input signal 239 in order to determine the state of the armature position of the pair of solenoids 230, 232. In other words, because of the preselected resistance levels of the resistors 240, 244, 236A, 236B and 250, the magnitude of the input signal is representative of the different operation states when the armature stops 74 are either in or not in contact with their outward stop 76. The addition of the resistor 250 adds another diagnostic capability.

Figure 10:
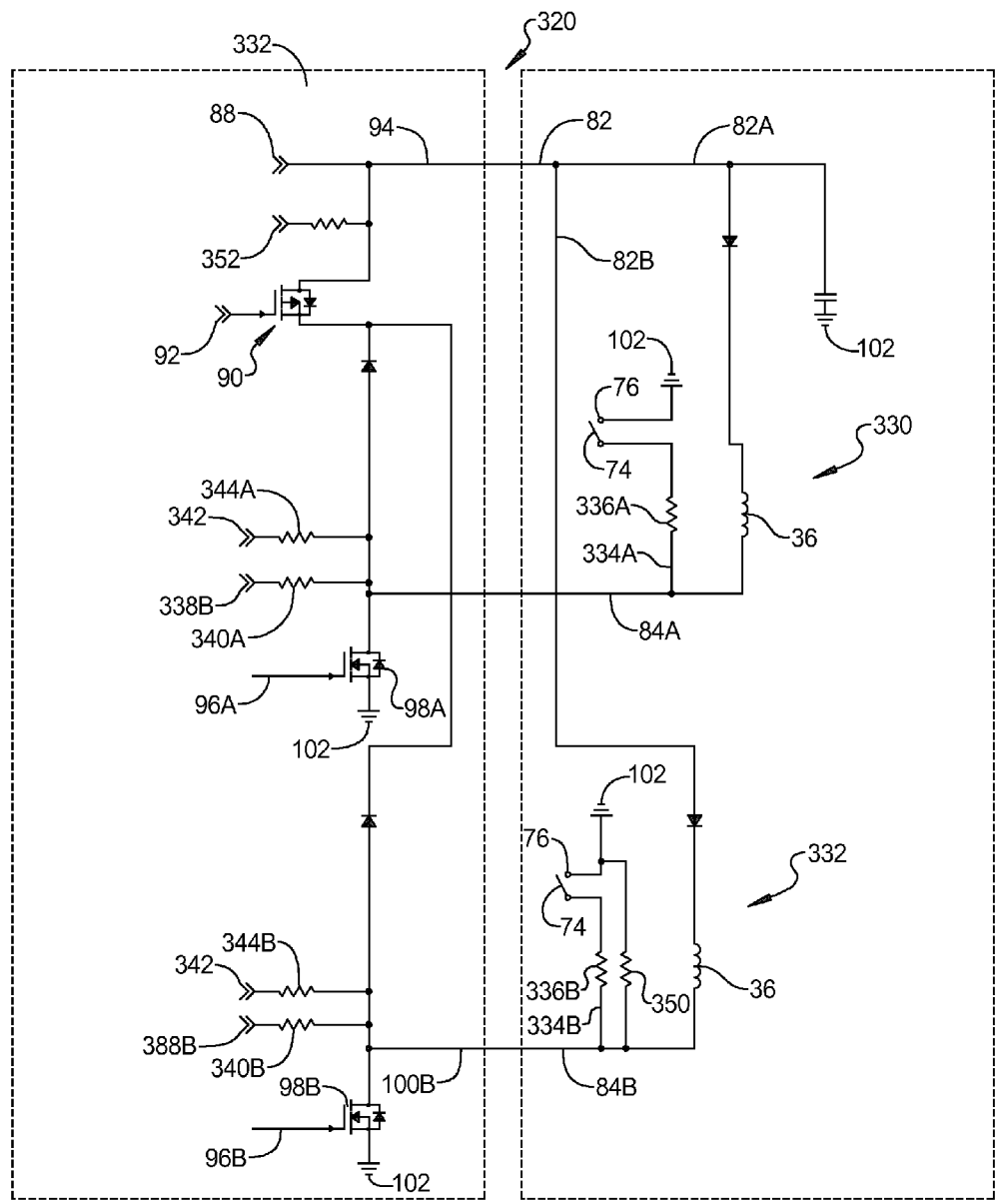
FIG. 10 is a schematic view of an electronic circuit for controlling and sensing a position of a pair of solenoid actuators according to a fourth embodiment of the present disclosure.

FIG. 10 is a schematic view of an alternative electronic circuit 320 including a control module 322 for controlling and sensing a position of the pair of solenoid actuators 330, 332 according to the principles of the present disclosure. The solenoid coils 36 of the solenoid actuators 330, 332 are both connected to a high side wire or conductor 82A, 82B and a low side wire or conductor 84A, 84B. The high side conductors 82A, 82B can be in the form of a shared conductor or wire 82 that is split into the two conductors 82A, 82B. The pair of solenoid actuators 330, 332 are provided with an armature stop 74 connected to the armatures 38 as described with respect to previous embodiments. An electrical contact 76 is provided in the form of a metal washer and serves as the armature's outward stop. Each of the electrical contacts 76 are connected to their respective low side conductors 84A, 84B via a respective wire or conductor 334A, 334B and resistor 336A, 336B. An additional resistor 350 connects the low side conductor 84B to ground 102. The high sides of the coils 36 can share the shared conductor/wire 82 in order to reduce wire count on the external harness and connector. It should be understood that separate wires/conductors could be utilized without a shared wire/conductor. Each of the high side conductor 82 and low side conductors 84A, 84B can be connected via a three pin connector to the control module 322.

The control module 322 generates a shared switched high side output signal 88 to a transistor 90 that connects a battery 92 or other power source to a shared high side conductor 94 which is in turn connected to the shared high side conductor 82 that connects the battery 92 to the solenoid coils 36. The control module 322 generates a pair of respective outputs 96A, 96B to a pair of low side transistors 98A, 98B which connect a pair of low side conductors 100A, 100B to ground 102. The low side conductors 100A, 100B are connected to the low side conductors 84A, 84B so that in operation, when the high side conductors 82A and 82B are connected to the

TABLE 2

| | | A-to-D Reading | | Sensed Armature Position | | |
|---|---|---|---|---|---|---|
| HSD Command | Equation | | Percent of $V_{Ref}$ Using Examples Resistor Values | Solenoid #1 | Solenoid #2 | Diagnostic Fault Status |
| ON | $V_{A2D} > V_{Ref}$ | | 100% (saturated) | Unknown | Unknown | No Fault Detected |
| | $V_{A2D} < V_{Ref}$ | | <100% | Unknown | Unknown | Shared High Side Wire Short to Ground; OR $V_{batt}$ is lower than $V_{Ref}$ |
| OFF | $V_{A2D} = \sim V_{Ref}$ | | ~100% | Unknown | Unknown | Shared High Side Wire Short to Power; OR Shared High Side Wire Open Circuit; OR Actuator Assembly Loss of Ground |
| | $V_{A2D} = V_{Ref} * [1 - R_H/(R_H + R_1)]$ | | 88% | Not Fully Out | Not Fully Out | No Fault Detected |
| | $V_{A2D} = V_{Ref} * [1 - R_H/(R_H + R_L \| \| R_1)]$ | | 56% | Fully Out | Not Fully Out | No Fault Detected |
| | $V_{A2D} = V_{Ref} * [1 - R_H/(R_H + R_L \| \| R_2)]$ | | 41% | Not Fully Out | Fully Out | No Fault Detected |
| | $V_{A2D} = V_{Ref} * [1 - R_H/(R_H + R_L \| \| R_1 \| \| R_2)]$ | | 32% | Fully Out | Fully Out | No Fault Detected |
| | $V_{A2D} = \sim GND$ | | ~0% | Unknown | Unknown | Shared High Side Wire Short to Ground | battery 92 and either of the low side conductors 84A, 84B are connected to ground 102, then the respective solenoid coil 36 would be energized and armature 38 would be electromagnetically retracted.

In order to sense the position of the armatures 38 of the solenoids 330, 332 the low side conductors 100A and 100B are connected to control module inputs 338A, 338B via resistors 340A, 340B. The low side conductors 100A, 100B are also connected to a switched low voltage source 342 via resistors 344A, 344B. The resistors 336A, 336B, 350, 344A, 344B can have pre-selected resistances such that the voltage levels of the control module inputs are indicative to the contact state of the armature stops 74 with the electrical contact 76 of the solenoids 330, 332.

Accordingly, the control module 322 is able to monitor the input signal 338A, 338B in order to determine the state of the armature position of the pair of solenoids 330, 332. In other words, the magnitude of the input signal is representative of the different operation states when the armature stops 74 are either in or not in contact with their outward stop 76. The switched high side 88 is 12V during normal operation, the recirculation control 92 is enabled and the low side input signals 96A, 96B are operating in pulse width modulation. The measurement mode is entered by turning off the switched high side 88, turning off the recirculation control 92 and turning off the low side outputs 96A, 96B. A positive voltage is then applied to the low voltage source 342 and ground is applied to the switch ground reference 352 so that the diode 354 is reverse biased so no current flows through the solenoid and the position of the armatures of the solenoids 330, 332 can be readily detected via the analog inputs 338A, 338B.

FIG. 11A is a schematic view of an alternative electronic circuit 420 including a control module 422 for controlling and sensing a position of the pair of solenoid actuators 430, 432 according to the principles of the present disclosure. The solenoid coils 36 of the solenoid actuators 430, 432 are both connected to a high side wire or conductor 82A, 82B and a low side wire or conductor 84A, 84B. The pair of solenoid actuators 430, 432 are provided with an armature stop 74 connected to the armatures 38. An electrical contact 76 is provided in the form of a metal washer and serves as the armature's outward stop. Each of the electrical contacts 76 are connected to the respective high side wire or conductors 82A, 82B via a respective wire or conductor 434A, 434B and resistor 436A, 436B. An additional resistor 450A, 450B connects the conductors 434A, 434B to ground 102. The low-current electrical contacts 76 are insulated from the solenoid housing 40 by an electrical insulator that can be in the form of a plastic washer 80. Each of the high side conductors 82A, 82B and low side conductors 84A, 84B can be connected via a four pin connector 438 to the control module 422. Alternatively, two separate two-pin connectors can be used, which could allow the solenoids to be two identical parts without the need for a lead frame.

The control module 422 generates output signals 88A, 88B to transistors 90A, 90B that connect a battery 92 or other power source to high side conductors 94A, 94B which are in turn connected to the independent high side conductors 82A, 82B that connects the battery 92 to the solenoid coils 36. The control module 422 generates a pair of respective outputs 96A, 96B to a pair of low side transistors 98A, 98B which connect a pair of low side conductors 100A, 100B to ground 102. The low side conductors 100A, 100B are connected to the low side conductors 84A, 84B so that in operation, when the high side conductors 82A and 82B are connected to the battery 92 and either of the low side conductors 84A, 84B are connected to ground 102, then the respective solenoid coil 36 would be energized and armature 38 would be electromagnetically retracted.

In order to sense the position of the armatures 38 of the solenoids 430, 432 the high side conductors 94A, 94B are connected to a respective control module input 438A, 438B via resistors 440A, 440B. The high side conductors 94A, 94B are also connected to a reference voltage source 442A, 442B via resistors 444A, 444B. By way of non-limiting example, the resistors 444A, 444B can have a resistance of $1000\Omega$, the resistors 450A, 450B can have a resistance of $2000\Omega$ and the resistors 436A, 436B can have a resistance of $600\Omega$. When the armature stops 74, connected to the armatures 38, are in contact with the electrical contact 76 of the solenoids 430, 432 and the output signals 88A, 88b are off, the voltage supplied by the reference voltage source 442A, 442B are grounded through one or both of the resistors 436A, 436B. However, when the armature stop 74 is disengaged from the electrical contact 76 of the solenoids 430, 432, the voltage supplied by the reference voltage source 442A, 442B are supplied through the resistors 444A, 444B and 440A, 440B, and divided with resistors 450A, 450B so that a voltage signal is received indicative of the fact that both armatures 38 are in their retracted/energized state. Table 3 tabulates the different input readings based upon the various operative states of the two solenoids 430, 432 wherein the armatures 38 are "fully out" in an unenergized state and "not fully out" in an energized state.

TABLE 3

| | | A-to-D Reading | | Sensed | |
|---|---|---|---|---|---|
| HSD Command | Equation | | Percent of $V_{Ref}$ Using Examples Resistor Values | Armature Position | Diagnostic Fault Status |
| ON | $V_{A2D} > V_{Ref}$ | | 100% (saturated) | Unknown | No Fault Detected |
| | $V_{A2D} < V_{Ref}$ | | <100% | Unknown | Shared High Side Wire Short to Ground; OR |
| | | | | Unknown | Vbatt is lower than VRef |
| OFF | $V_{A2D} = \sim V_{Ref}$ | | ~100% | Unknown | High Side Wire Short to Power; OR High Side Wire Open Circuit, OR Solenoid Body Loss of Ground |
| | $V_{A2D} = V_{Ref} * [1 - R_H/(R_H + R_1)]$ | | 67% | Not Fully Out | No Fault Detected |
| | $V_{A2D} = V_{Ref} * [1 - R_H/(R_H + R_L \| \| R_1)]$ | | 32% | Fully Out | No Fault Detected |
| | $V_{A2D} = \sim GND$ | | ~0% | Unknown | Shared High Side Wire Short to Ground |

Accordingly, the control module 422 is able to monitor the input signals 438A, 438B in order to determine the state of the armature position of the pair of solenoids 430, 432. In other words, because of the preselected resistance levels of the resistors 440A, 440B, 444A, 444B, 436A, 436B, 450A, and 450B, the magnitude of the input signal is representative of the different operation states when the armature stops 74 are either in or not in contact with their outward stop 76. The independent high-side drivers 94A, 94B eliminates the potential issue of a short-to-ground on one of the low-sides causing an unintentional application of the other pawl 20 or 22 when the shared high side driver is turned on. The high-side and low side commands for each solenoid can be activated at the same time. This configuration provides analog voltage separation between steps of approximately 33% of the reference voltage for robustness to tolerances and ground offsets between the controller and case.

Figure 11B:
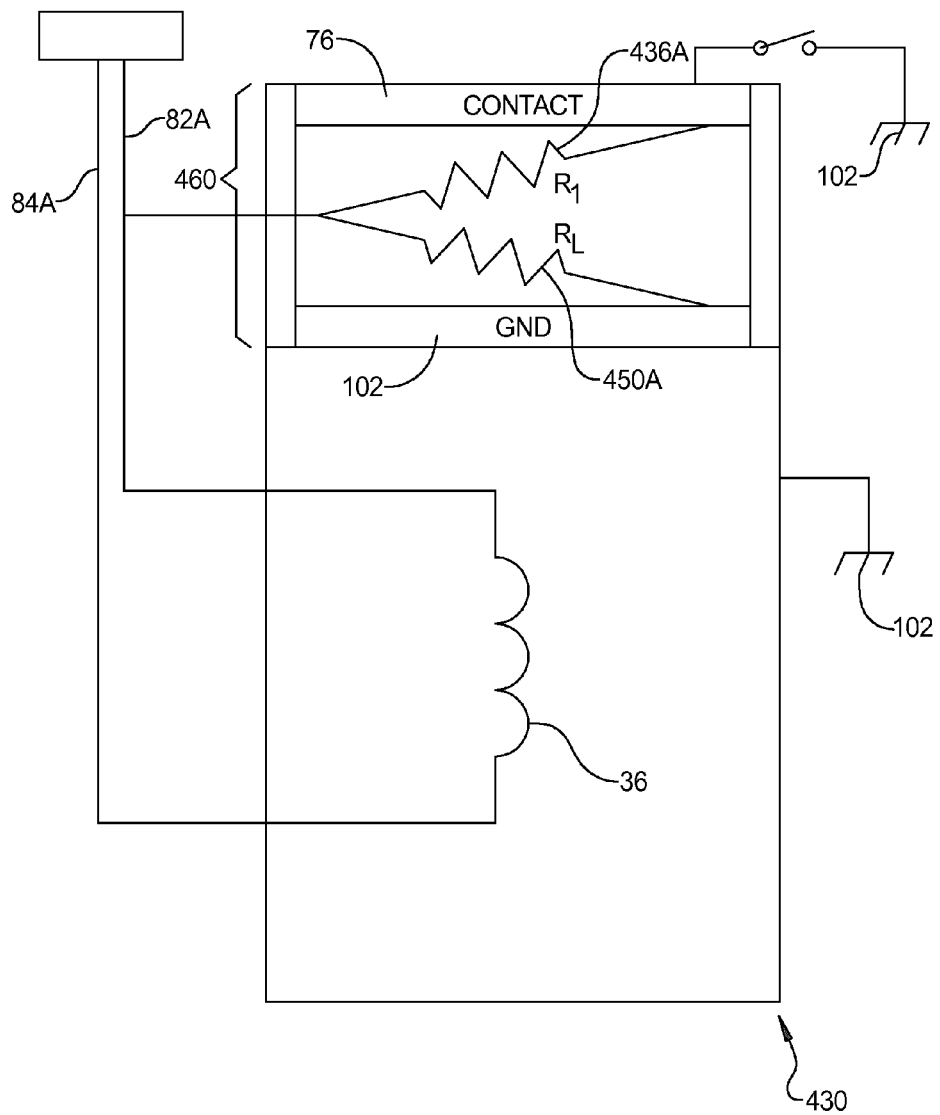
FIG. 11B is a schematic view of a portion of the electronic circuit of FIG. 11A.

It is anticipated that the resistors 436A, 436B, 450A, 450B can be incorporated into a washer-type body 460 that is disposed at an upper end of the solenoid housing and includes the electrical contacts 76 at an upper end as illustrated in FIG. 11B and a ground connection 102 at a lower end with the resistors 436A, 450A; 436B, 450B embedded within the washer-type body and connected to the high-side conductors 82A, 82B.

Figure 12:
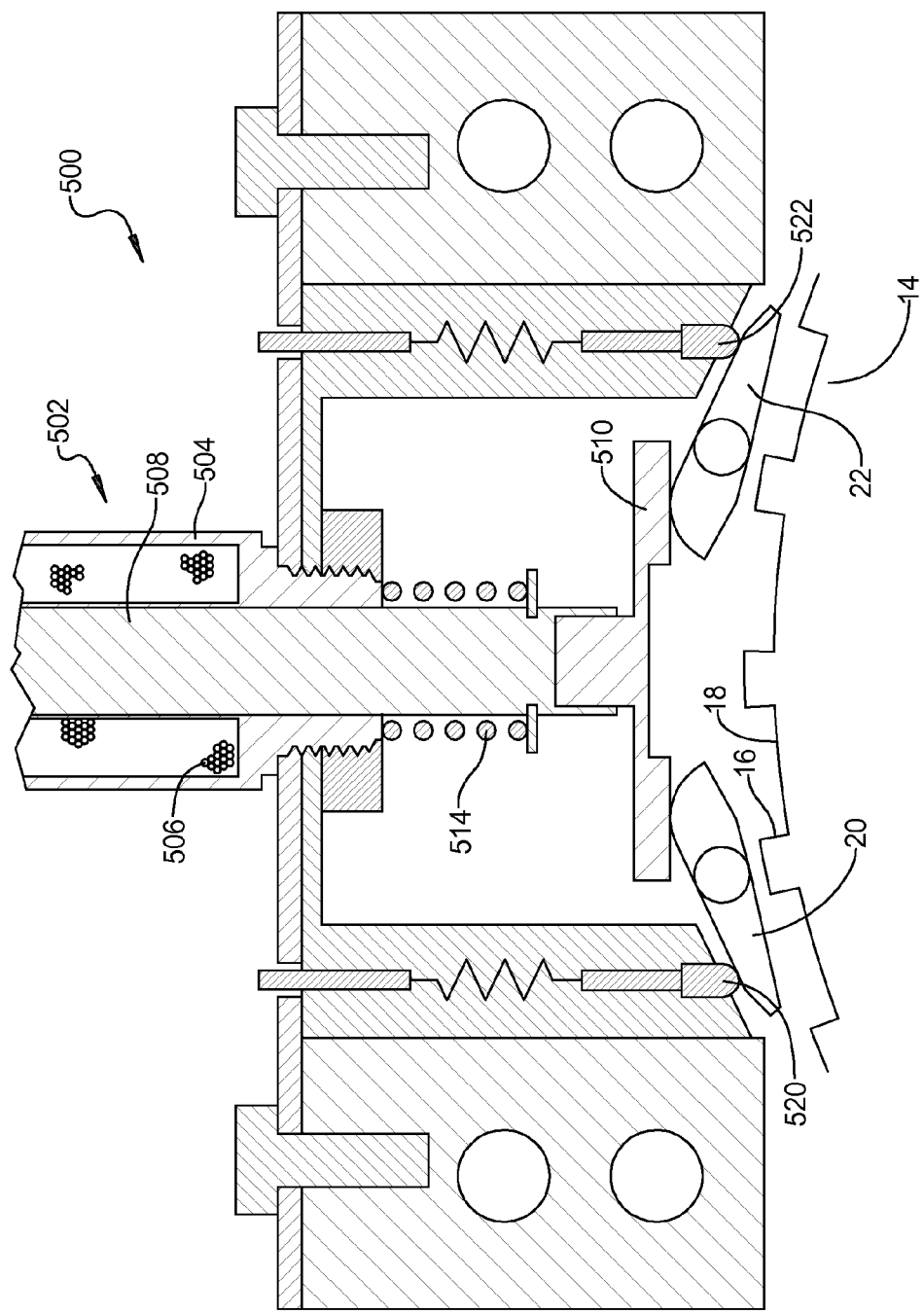
FIG. 12 is a schematic view of an ultra-low-loss bi-directional transmission brake utilizing a single solenoid electro-mechanical actuator shown in a forward and reverse rotation free state according to the principles of the present disclosure.

With reference to FIG. 12, a single solenoid actuator assembly 500 is shown for actuating a forward preventer pawl 20 and a reverse preventer pawl 22 into and out of engagement with the teeth 16 of the rotor 14. The single solenoid actuator assembly 500 includes a single solenoid 502 having a housing 504, a solenoid coil 506 and an armature 508. The armature 508 includes an engagement plate 510 mounted to an end of the armature 508. The engagement plate 510 extends laterally in opposite directions and when the armature 508 is fully extended under the biasing force of the return spring 514, engages the forward and reverse preventer pawls 20, 22 to bias the forward and reverse preventer pawls 20, 22 to a disengaged position, as illustrated in FIG. 12. A pair of pawl position sensors 520, 522 are provided for detecting the position of the forward and reverse preventer pawls 20, 22. When the forward and reverse preventer pawls 520 and 522 are in the disengaged position as shown in FIG. 12, the engagement plate 510 biases the pawls 20, 22 against the sensors 520, 522.

Figure 13:
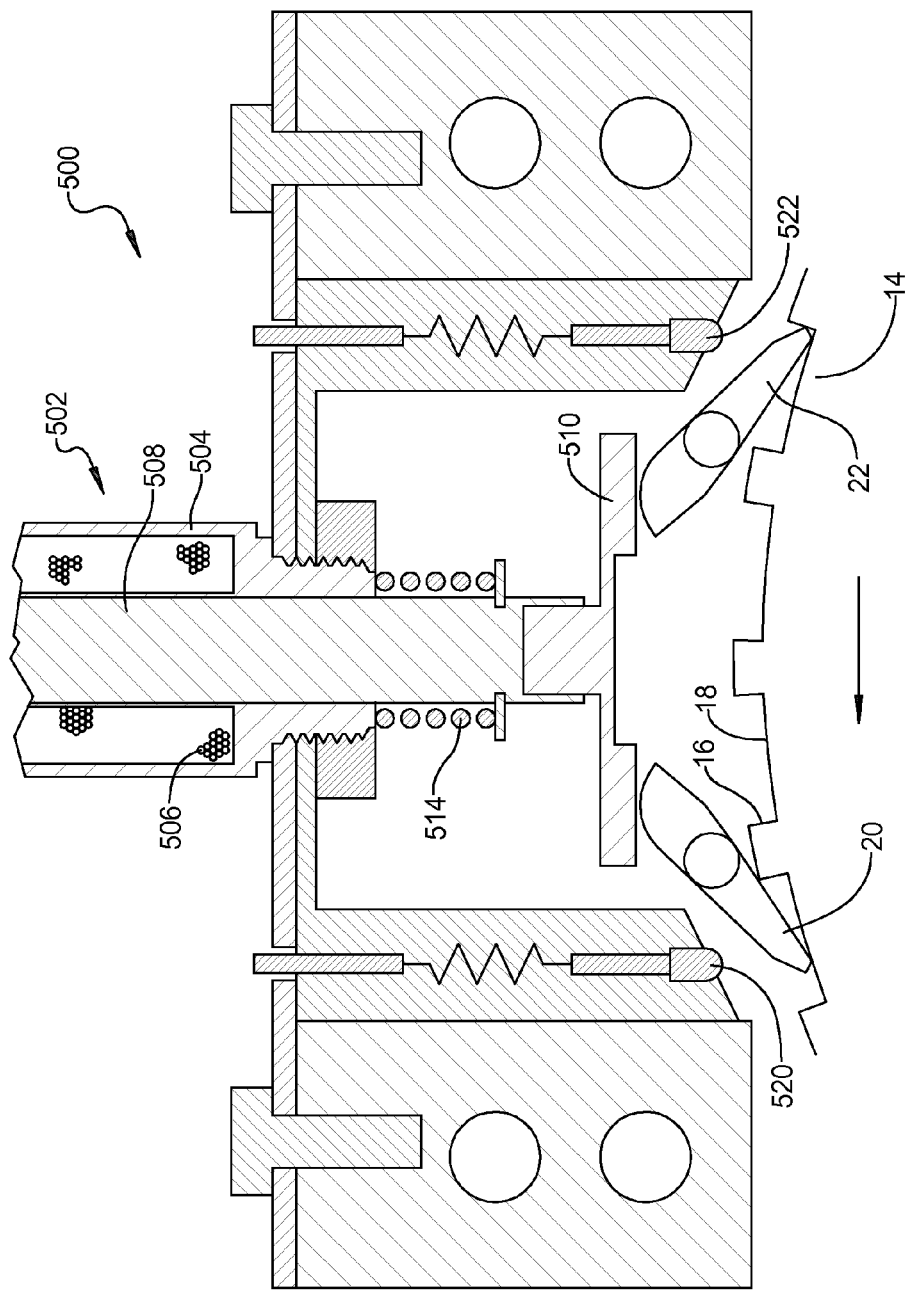
FIG. 13 is a schematic view of the single solenoid electro-mechanical actuator of FIG. 12 shown in a forward rotation preventer and reverse rotation preventer state with the pawls engaged with the rotor teeth.
Figure 14:
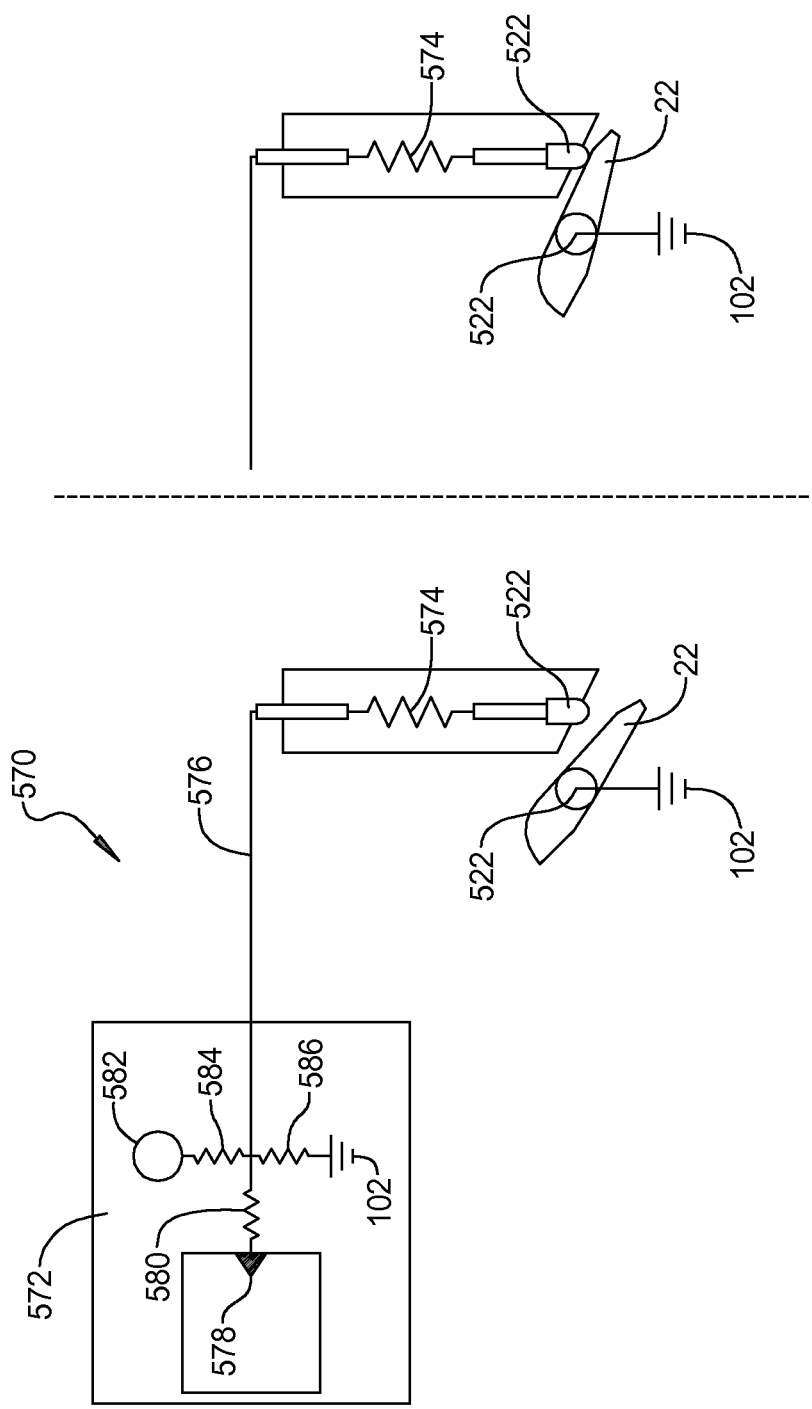
FIG. 14 is a schematic view of an electronic circuit for sensing a position of a pair of pawls controlled by a solenoid actuator according to the principles of the present disclosure.

With reference to FIG. 13, the solenoid 502 can be energized to cause the armature 508 to be retracted against the biasing force of the return spring 514 and the pawls are spring biased so that the forward and reverse preventer pawls 20 and 22 move into engagement with the teeth 16 of the rotor 14. With reference to FIG. 14, a schematic view of an electronic circuit 570 including a control module 572 for sensing a position of the forward and reverse preventer pawls 20, 22. The pair of pawl position sensors 520, 522 are each connected to a resistor 574 and a conductor 576 which provide an input 578 to the control module 572 through a resistor 580. The conductor 576 is connected to a reference voltage source 582 through a resistor 584 and is connected to ground 102 through a resistor 586. The forward and reverse preventer pawls 20, 22 are each connected to ground 102. When the forward and reverse preventer pawls 20, 22 come into contact with the pawl position sensors 520, 522, the conductor 576 is then connected to ground 102 through the resistor 574. By way of non-limiting example, the resistors 574 can have a resistance of 600Ω, the resistors 584 can have a resistance of 1000Ω and the resistors 586 can have a resistance of 2000Ω.

Table 4 tabulates the different input voltages 578 based upon the operative states of the forward and reverse preventer pawls 20, 22 being either in engagement with or out of engagement with the pawl position sensors 520, 522.

TABLE 4

| | A-to-D Reading | | Sensed | |
|---|---|---|---|---|
| Equation | | Percent of $V_{Ref}$ Using Examples Resistor Values | Armature Position | Diagnostic Fault Status |
| $V_{A2D} = \sim V_{Ref}$ | | ~100% | Unknown | High Side Wire Short to Power |
| $V_{A2D} = V_{Ref} * [1 - R_H/(R_H + R_L)]$ | | 67% | Not Fully Out | No Fault Detected |
| $V_{A2D} = V_{Ref} * [1 - R_H/(R_H + R_L \mid\mid R_1)]$ | | 32% | Fully Out | No Fault Detected |
| $V_{A2D} = \sim GND$ | | ~0% | Unknown | Shared High Side Wire Short to Ground |

Accordingly, the control module 572 is able to monitor the input signals 578 in order to determine the state of the preventer pawls 20, 22. In other words, because of the preselected resistance levels of the resistors 574, 580, 584 and 586, the magnitude of the input signal 578 is representative of the different operation states when the forward and reverse preventer pawls 20, 22 are engaged with or disengaged from the pawl position sensors 520, 522. It should be understood that the pawl position sensors, according to the present disclosure, can be used with a one or multiple pawl brake/clutch system and with a one or multiple solenoid brake/clutch system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator for preventing rotation of a rotary component including a plurality of teeth, comprising:
   a first pawl pivotable about a first pivot axis and engageable with said rotary component for preventing rotation of the rotary component in a first rotary direction, said first pawl being spring biased toward an engaged position with said rotary component;
   a second pawl pivotable about a second pivot axis and engageable with said rotary component for preventing rotation of the rotary component in a second rotary direction opposite the first rotary direction, said second pawl being spring biased toward an engaged position with said rotary component;

a first solenoid including a first electrically activated solenoid and a first armature movable from a first position for holding said first pawl out of engagement with the rotary component to a second position for allowing said first pawl to be engaged with the rotary component; and a second solenoid including a second electrically activated solenoid and a second armature movable from a first position for holding said second pawl out of engagement with the rotary component to a second position for allowing said second pawl to be engaged with the rotary component;

wherein said first and second pawls each include a first end engageable with the rotary component and a second end engageable directly by said first and second armatures of said first and second solenoids;

wherein said first and second armatures are biased toward said first position by a return spring;

wherein said first and second armatures are biased toward said first position by a return spring.

2. The actuator according to claim 1, wherein said first pawl and said second pawl are pivotally mounted to a pawl mounting plate;

wherein said pawl mounting plate has a profile with a pair of extending ear portions adjacent to a pair of mounting apertures that receive a pair of pawl pivots and a gap space between the pair of extending ear portions wherein said gap space defines a clearance for the teeth of the rotor.

3. An actuator for preventing rotation of a rotary component including a plurality of teeth, comprising:

a first pawl pivotable about a first pivot axis and engageable with said rotary component for preventing rotation of the rotary component in a first rotary direction, said first pawl being spring biased toward an engaged position with said rotary component;

a second pawl pivotable about a second pivot axis and engageable with said rotary component for preventing rotation of the rotary component in a second rotary direction opposite the first rotary direction, said second pawl being spring biased toward an engaged position with said rotary component;

a first solenoid including a first electrically activated solenoid and a first armature movable from a first position for holding said first pawl out of engagement with the rotary component to a second position for allowing said first pawl to be engaged with the rotary component; and a second solenoid including a second electrically activated solenoid and a second armature movable from a first position for holding said second pawl out of engagement with the rotary component to a second position for allowing said second pawl to be engaged with the rotary component;

wherein said first pawl and said second pawl are pivotally mounted to a pawl mounting plate;

wherein said pawl mounting plate has a profile with a pair of extending ear portions adjacent to a pair of mounting apertures that receive a pair of pawl pivots and a gap space between the pair of extending ear portions wherein said gap space defines a clearance for the teeth of the rotor;

wherein said pawl mounting plate, said first solenoid and said second solenoid are mounted to a common one-piece frame.

4. The actuator according to claim 3, wherein said common frame includes at least one bolt hole and at least one dowel pin hole for mounting the common frame.

5. An actuator for preventing rotation of a rotary component including a plurality of teeth, comprising:

a pawl pivotable about a pivot axis and engageable with said rotary component for preventing rotation of the rotary component in a first rotary direction, said pawl being biased toward an engaged position with said rotary component;

a solenoid including an electrically activated solenoid and an armature directly engaging an end of the pawl and movable from a first position for holding the pawl out of engagement with the rotary component to a second position for allowing the pawl to be engaged with the rotary component wherein said armature is biased toward said first position by a return spring;

wherein said armature includes a spring seat at a distal end of the armature for engaging said return spring.

6. The actuator according to claim 5, wherein said pawl includes a first end engageable with the rotary component and a second end engageable directly by said armature of said solenoid.

7. An actuator for preventing rotation of a rotary component including a plurality of teeth, comprising:

a pawl pivotable about a pivot axis and engageable with said rotary component for preventing rotation of the rotary component in a first rotary direction, said pawl being biased toward an engaged position with said rotary component;

a solenoid including an electrically activated solenoid and an armature directly engaging an end of the pawl and movable from a first position for holding the pawl out of engagement with the rotary component to a second position for allowing the pawl to be engaged with the rotary component;

wherein said pawl is pivotally mounted to a pawl mounting plate; and wherein said pawl mounting plate and said solenoid are mounted to a common one-piece frame.

8. An actuator for preventing rotation of a rotary component including a plurality of teeth, comprising:

a pawl pivotable about a pivot axis and engageable with said rotary component for preventing rotation of the rotary component in a first rotary direction, said pawl being biased toward an engaged position with said rotary component;

a solenoid including an electrically activated solenoid and an armature directly engaging an end of the pawl and movable from a first position for holding the pawl out of engagement with the rotary component to a second position for allowing the pawl to be engaged with the rotary component;

wherein said pawl includes a first end engageable with the rotary component and a second end engageable directly by said armature of said solenoid, wherein said common frame includes at least one bolt hole and at least one dowel pin hole for mounting the common frame.

\* \* \* \* \*